US010448085B2

(12) United States Patent
Bugajski et al.

(10) Patent No.: US 10,448,085 B2
(45) Date of Patent: Oct. 15, 2019

(54) USER INTERFACE WITH VIDEO FRAME TILES

(71) Applicant: ARRIS Enterprises, Inc., Suwanee, GA (US)

(72) Inventors: Marek Bugajski, Norcross, GA (US); Marcin Morgos, Warsaw (PL)

(73) Assignee: ARRIS Enterprises LLC, Suwanee, GA (US)

( * ) Notice: Subject to any disclaimer, the term of this patent is extended or adjusted under 35 U.S.C. 154(b) by 120 days.

(21) Appl. No.: 14/698,042

(22) Filed: Apr. 28, 2015

(65) Prior Publication Data

US 2015/0312629 A1    Oct. 29, 2015

Related U.S. Application Data (60) Provisional application No. 61/985,181, filed on Apr. 28, 2014.

(51) Int. Cl.
| | |
|---|---|
| *H04N 21/431* | (2011.01) |
| *H04N 21/462* | (2011.01) |
| *H04N 21/45* | (2011.01) |
| *H04N 21/472* | (2011.01) |
| *H04N 5/445* | (2011.01) |
| *H04N 21/4402* | (2011.01) |
| *H04N 21/482* | (2011.01) |

(Continued)

(52) U.S. Cl.
CPC ..... *H04N 21/4312* (2013.01); *H04N 5/44543* (2013.01); *H04N 21/4314* (2013.01); *H04N 21/4318* (2013.01); *H04N 21/440263* (2013.01); *H04N 21/440272* (2013.01); *H04N 21/440281* (2013.01); *H04N 21/4532* (2013.01); *H04N 21/4586* (2013.01); *H04N 21/4622* (2013.01); *H04N 21/4751* (2013.01);
(Continued)

(58) Field of Classification Search
CPC ............... H04N 21/472; H04N 21/482; H04N 21/4821; H04N 21/440272; H04N 21/4586; H04N 5/44543; H04N 21/440263; H04N 21/440281; H04N 21/4828; H04N 21/4314; H04N 21/4753; H04N 21/4312; H04N 21/4622; H04N 21/4532; H04N 21/47202; H04N 21/47211; H04N 21/475
See application file for complete search history.

(56) References Cited

U.S. PATENT DOCUMENTS

| | | | |
|---|---|---|---|
| 8,385,426 B2 * | 2/2013 | Shen ........................ | H04N 5/45 375/240.13 |
| 2008/0148179 A1 * | 6/2008 | Sloo ....................... | G06F 3/0482 715/792 |

(Continued)

OTHER PUBLICATIONS

PCT Search Report & Written Opinion, RE: Application No. PCT/US2015/027944; dated Jun. 29, 2015.

*Primary Examiner* — Benjamin R Bruckart
*Assistant Examiner* — Akshay Doshi
(74) *Attorney, Agent, or Firm* — Bart A. Perkins (57) ABSTRACT

Methods, systems, and computer readable media can be operable to facilitate the provisioning of a user interface with video frame tiles. Specific content sources or pieces of content may be identified according to various parameters, and media renderings of the associated content may be generated. The media renderings may be processed at a device receiving the content, and a user interface including one or more of the media renderings may be generated. The media renderings may be organized within the user interface as individual video frame tiles.

19 Claims, 7 Drawing Sheets

(51) Int. Cl.
*H04N 21/458* (2011.01)
*H04N 21/475* (2011.01)

(52) U.S. Cl.
CPC ..... *H04N 21/4753* (2013.01); *H04N 21/4755* (2013.01); *H04N 21/47202* (2013.01); *H04N 21/47211* (2013.01); *H04N 21/4821* (2013.01); *H04N 21/4828* (2013.01); *H04N 2005/44556* (2013.01)

(56) References Cited

U.S. PATENT DOCUMENTS

| | | | | |
|---|---|---|---|---|
| 2008/0163059 A1* | 7/2008 | Craner | ............... | H04N 5/44543 715/719 |
| 2009/0083824 A1* | 3/2009 | McCarthy | .......... | H04N 5/44591 725/151 |
| 2010/0058213 A1 | 3/2010 | Higuchi et al. | | |
| 2010/0247064 A1* | 9/2010 | Yeh | ................... | G06F 17/30849 386/248 |
| 2011/0078731 A1* | 3/2011 | Nishimura | ............... | G06F 9/453 725/39 |
| 2012/0174037 A1 | 7/2012 | Relyea et al. | | |
| 2012/0304229 A1* | 11/2012 | Choi | ................... | H04N 21/8173 725/41 |
| 2013/0080895 A1* | 3/2013 | Rossman | ............ | G06F 3/04883 715/720 |
| 2013/0283318 A1 | 10/2013 | Wannamaker | | |
| 2014/0164938 A1* | 6/2014 | Petterson | ............... | G06F 3/0482 715/739 |
| 2016/0191997 A1* | 6/2016 | Eklund | ......... | H04N 21/440281 725/59 |

* cited by examiner

USER INTERFACE WITH VIDEO FRAME TILES

CROSS REFERENCE TO RELATED APPLICATION

This application is a non-provisional application claiming the benefit of U.S. Provisional Application Ser. No. 61/985,181, entitled "User Interface with Video Frame Tiles," which was filed on Apr. 28, 2014, and is incorporated herein by reference in its entirety.

TECHNICAL FIELD

This disclosure relates to a user interface including one or more video frame tiles.

BACKGROUND

Service and content providers continue to offer subscribers a growing number and widening breadth of content sources and formats through which content may be consumed. Moreover, subscribers typically consume content using a growing number of devices within a subscriber premise. With such a wide variety of content to choose from, it is desirable to improve upon methods and systems for personalizing, organizing and displaying content that is available to a subscriber for consumption.

BRIEF DESCRIPTION OF THE DRAWINGS

Like reference numbers and designations in the various drawings indicate like elements.

DETAILED DESCRIPTION

It is desirable to improve upon methods and systems for organizing and displaying available multimedia content to a subscriber. Methods, systems, and computer readable media can be operable to facilitate the provisioning of a user interface with video frame tiles. Specific content sources or pieces of content may be identified according to various parameters, and media renderings of the associated content may be generated. The media renderings may be processed at a device receiving the content, and a user interface including one or more of the media renderings may be generated. The media renderings may be organized within the user interface as individual video frame tiles.

An embodiment of the invention described herein may include a method comprising: (a) identifying one or more pieces of content; (b) retrieving a media rendering for each of the one or more pieces of content; (c) associating each of the retrieved media renderings with a tile within an interface comprising one or more tiles; and (d) outputting the interface to a display, wherein each of the media renderings is displayed within an associated tile.

According to an embodiment of the invention, the media rendering for each of the one or more pieces of content is displayed within an associated tile at a variable frame per second rate.

According to an embodiment of the invention, the method may include receiving user input, wherein a tile within the interface is selected; and increasing the rate at which the media rendering associated with the selected tile is updated.

According to an embodiment of the invention, one or more of the identified pieces of content are identified based on a content source associated with each of the pieces of content.

According to an embodiment of the invention, the method may include receiving user input, wherein the user input comprises a selection of one or more filter categories; and wherein the identified one or more pieces of content comprise pieces of content associated with the one or more filter categories.

According to an embodiment of the invention, associating each of the retrieved media renderings with a tile within an interface comprising one or more tiles comprises: organizing the layout of tiles within the interface based on relevance of the associated pieces of content to a user.

According to an embodiment of the invention, the method may include receiving user input, wherein the user input comprises an identification of a viewer; and wherein the identified one or more pieces of content comprise pieces of content associated with the viewer.

According to an embodiment of the invention, associating each of the retrieved media renderings with a tile within an interface comprising one or more tiles comprises: identifying a first piece of content from the one or more identified pieces of content, wherein the first piece of content comprises the piece of content most recently accessed by the viewer relative to the other one or more identified pieces of content; associating the media rendering for the first piece of content with a tile positioned at the first slot in a top row of the interface; identifying a second piece of content from the one or more identified pieces of content, wherein the second piece of content comprises the next most recently accessed piece of content, after the first piece of content, by the viewer; and associating the media rendering for the second piece of content with a tile positioned immediately adjacent to the tile associated with the first piece of content.

According to an embodiment of the invention, the retrieved media rendering associated with a respective piece of content of the one or more identified pieces of content is generated from one or more still frame images associated with the respective piece of content.

According to an embodiment of the invention, the retrieved media rendering associated with a respective piece of content of the one or more identified pieces of content is generated from one or more sequences of still video frames associated with the respective piece of content.

According to an embodiment of the invention, the retrieved media rendering associated with a respective piece of content of the one or more identified pieces of content is generated from one or more video streams associated with the respective piece of content.

An embodiment of the invention described herein may include an apparatus comprising: (a) a module configured to: identify one or more pieces of content; retrieve a media rendering for each of the one or more pieces of content; and associate each of the retrieved media renderings with a tile within a user interface comprising one or more tiles; and (2) an interface configured to be used to output the user interface to a display, wherein each of the media renderings is displayed within an associated tile.

An embodiment of the invention described herein may include one or more non-transitory computer readable media having instructions operable to cause one or more processors to perform the operations comprising: (a) identifying one or more pieces of content; (b) retrieving a media rendering for each of the one or more pieces of content; (c) associating each of the retrieved media renderings with a tile within an interface comprising one or more tiles; and (d) outputting the interface to a display, wherein each of the media renderings is displayed within an associated tile.

Figure 1:
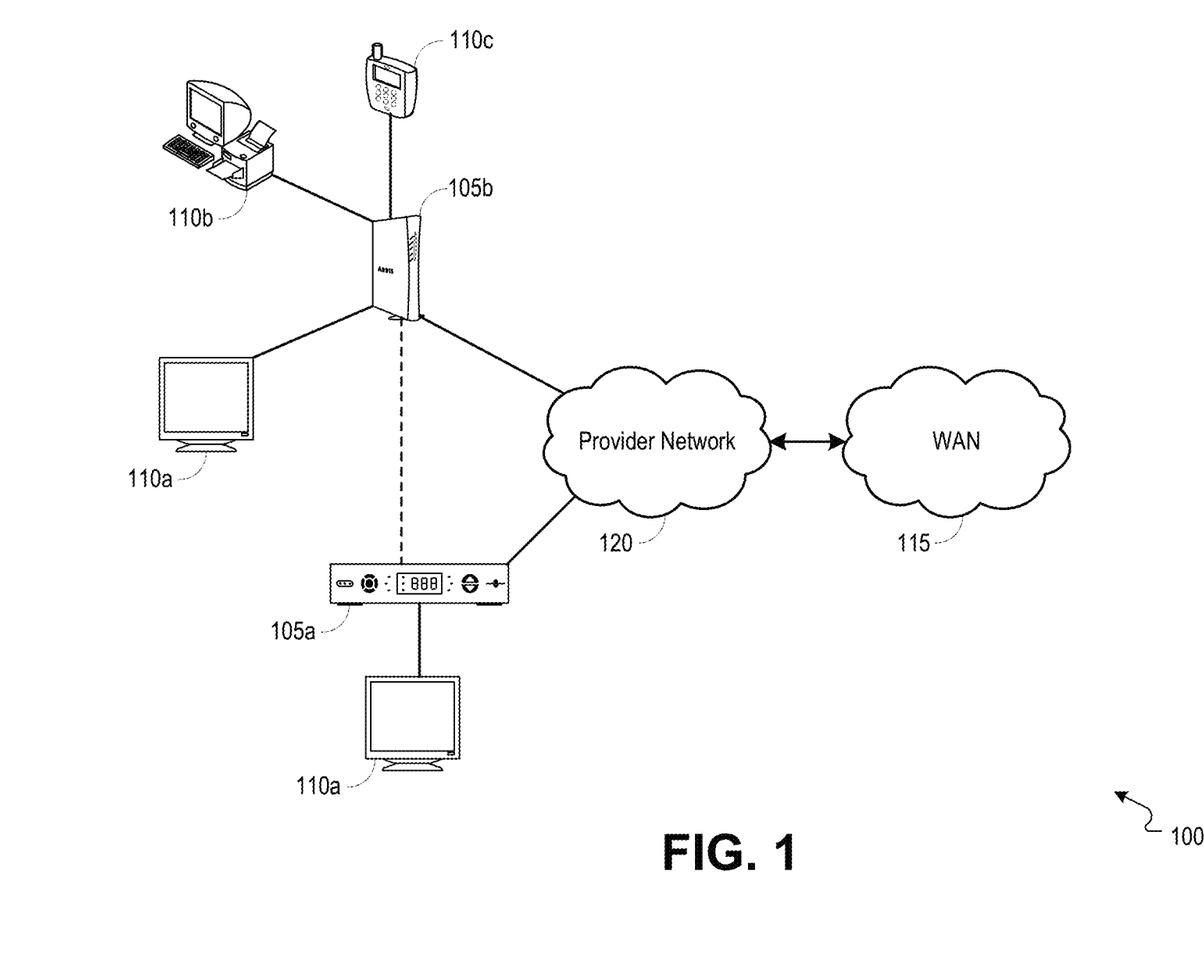
FIG. 1 is a block diagram illustrating an example network environment operable to facilitate the provisioning of a user interface with video frame tiles.

FIG. 1 is a block diagram illustrating an example network environment 100 operable to facilitate the provisioning of a user interface with video frame tiles. In embodiments, video, voice, and/or data services may be delivered to one or more customer premise equipment (CPE) devices. The CPE devices may include a set-top box (STB) 105*a*, a gateway device 105*b*, a cable modem (not shown), a digital subscriber line (DSL) modem (not shown), a satellite receiver (not shown), or any other device operable to provide a subscriber with access to video, voice, and/or data services.

In embodiments, a subscriber may interact with the provided service(s) through a client device. The client devices may include a television 110*a*, computer 110*b*, mobile device 110*c*, tablet (not shown), gaming console (not shown), and any other device operable to receive video, voice, and/or data services. One or more CPE devices (e.g., STB 105*a*, gateway device 105*b*, etc.) may route communications to and from the one or more client devices. It should be understood that various data, multimedia, and/or voice services may be delivered to the client devices, including but not limited to, live or broadcast television, video-on-demand (VoD) content, pay-per view content, recorded content (e.g., DVR content), audio-only content, streaming content, and others. It should be further understood that the devices shown in FIG. 1 may be integrated. For example, a subscriber may interact with provided video services through a television 110*a* that is connected to a STB 105*a* and/or a gateway device 105*b*.

In embodiments, multiple services (e.g., video, voice, and/or data services) may be delivered from a wide-area network (WAN) 115 to the CPE devices and/or client devices through a connection to a provider network 120. The provider network 120 may include an optical network, hybrid fiber coaxial (HFC) network, digital subscriber line (DSL) network, twisted-pair, mobile network, high-speed data network, MoCA network, and any other network configured to carry communications to and/or from the CPE devices and/or client devices.

In embodiments, a CPE device may provide a local network for passing communications to and from and/or between other CPE devices and/or client devices. The local network may include a local area network (LAN), wireless local area network (WLAN), personal area network (PAN), Multimedia over Coax Alliance (MoCA) network, mobile hotspot network, and others. It should be understood that a STB 105*a* may provide video services to a subscriber through a direct connection with a provider network 120 or through a connection to an access point (e.g., gateway device 105*b*, etc.) that is connected to the provider network 120. It will be appreciated by those skilled in the relevant art that delivery of the multiple services over the local network may be accomplished using a variety of standards and formats.

In embodiments, a CPE device or client device may be configured to provide a user interface with video frame tiles. The user interface may include one or more video frame tiles, wherein each video frame tile is associated with a video source (e.g., channel) or a piece of video content (e.g., VoD content, DVR content, etc.). For example, the video frame tile may include a display of video and, in some instances, audio associated with a specific piece of content or a piece of content associated with a specific video source. A piece of content, as used herein, may include either a specific piece of content or content source. A specific piece of content or specific content source may also be identified (e.g., within a user interface) as a content identifier.

In embodiments, one or more video frame tiles may be displayed in a user interface, and each video frame tile may include a media rendering of the content currently available for viewing from the video source associated with the video frame tile (e.g., live broadcast channel, streaming channel, storage internal or external to a CPE device, etc.). The media rendering may include one or more images, video, and/or audio associated with the content. The media rendering of the content may be a live stream of the content currently being received from the associated video source, a sampling of the content being received from the associated video source, or a preview or summary of the content being received from the associated video source. The media rendering of the content may be updated, for example, at a constant or variable frame per second rate.

In embodiments, one or more of the video frame tiles may include a media rendering of the content associated with a specific piece of content (e.g., VoD content, DVR content, content available for streaming to a device, etc.). The media rendering may include one or more images, video, and/or audio associated with the content. The media rendering of the content may be a certain portion of the associated piece of content, or a preview or summary of the associated piece of content, the preview or summary including one or more segments of the associated content.

In embodiments, the video frame tiles that are displayed in the user interface may be associated with the most recently viewed video source or piece of content. The video frame tiles may be laid out or organized within the user interface according to the relevance of the associated content to a specific device or user. For example, a video frame tile associated with the most-recently viewed video source or piece of content may be positioned in the top-left (with respect to a viewer looking at the displayed interface) location of the field of video frame tiles, and the video frame tiles associated with the earlier viewed video sources or pieces of content may be positioned to the right of the most-recently viewed video source or piece of content. The video frame tile associated with the video source or piece of content viewed immediately earlier than the source or content associated with the rightmost tile in any row may be positioned in the leftmost location in the next lowest row.

In embodiments, the one or more video frame tiles displayed in the user interface may include one or more video frame tiles associated with a specific category. For example, a subscriber may select a category from one or more available categories (e.g., live television or content, recorded content, VoD content, content available online or through an application such as YouTube or Netflix, etc.) to view the video frame tiles associated with content that is available within the selected category. In embodiments, displayed video frame tiles may be associated with content that is related to a specific viewer. For example, a subscriber can select a viewer from one or more viewers, and displayed video frame tiles may be associated with content that is or is likely to be preferred by the selected viewer. When a viewer is selected, the displayed video frame tiles may be updated to show video frame tiles associated with the video source(s) and/or pieces of content most recently viewed by the selected viewer.

In embodiments, video frame tiles may be selected for closer examination by enabling and moving a highlight feature (e.g., a cursor) inside the field of tiles. The display of the selected or highlighted video frame tile may be distinguished from the other video frame tiles within the field. For example, a selected or highlighted video frame tile may be brighter or otherwise distinguished from the remaining video frame tiles, and/or the video frame rate at which the content displayed within the selected video frame tile is updated may be increased to a faster rate than the other tiles. In embodiments, when a video frame tile is selected, audio of the content associated with the video frame tile may be output.

Additional text such as a content summary, poster art, channel logo, and/or other information identifying or describing the content associated with a selected video frame tile may be displayed in the user interface. In embodiments, when a video frame tile associated with a video source is selected, information associated with programming in a next timeslot for the video source can be displayed in the user interface.

In embodiments, the video frame tiles displayed in the user interface may be filtered according to a selected filter category (e.g., all content, favorites, trending, movies, sports, music, family, news, grid, etc.). When a new filter category is selected, the content associated with each of the displayed tiles may be updated. For example, displayed video frame tiles may be updated to show video frame tiles associated with a filter category when a subscriber highlights the filter category with a cursor. Displayed tiles can be updated to show tiles associated with content defined by a selected content category.

Figure 2:
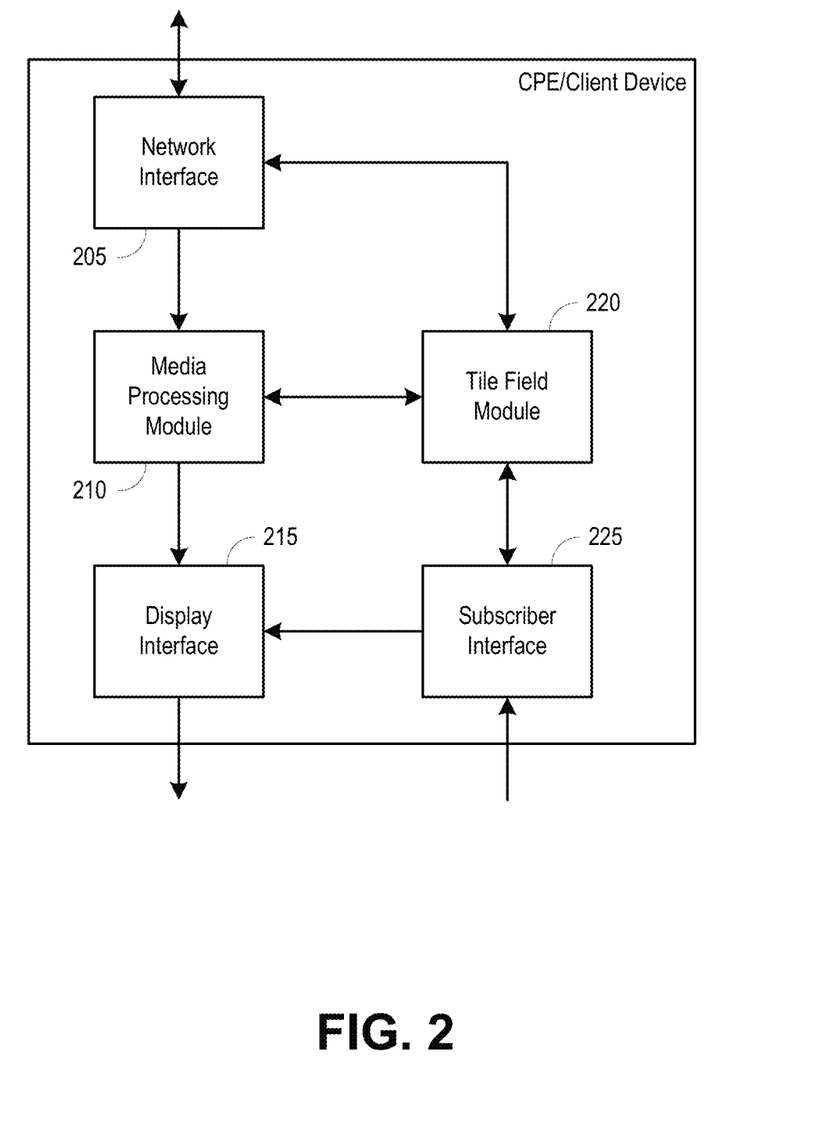
FIG. 2 is a block diagram illustrating an example device component operable to facilitate the provisioning of a user interface with video frame tiles.

FIG. 2 is a block diagram illustrating an example device operable to facilitate the provisioning of a user interface with video frame tiles. The device may include a network interface 205, a media processing module 210, a display interface 215, a tile field module 220, and a subscriber interface 225. In embodiments, the device may be a CPE device (e.g., STB 105a of FIG. 1, gateway device 105b of FIG. 1, etc.), a client device (e.g., client devices 110a-c of FIG. 1), or any other device configured to provide video services to a subscriber. It should be understood that the user interface with video frame tiles may be generated at a CPE device, client device, or upstream network component (e.g., device at a provider central office or headend, MSO or provider server, etc.).

In embodiments, the CPE/client device may receive multimedia content from an upstream network through a network interface 205. Multimedia content received at the CPE/client device may include linear or broadcast content delivered over one or more downstream channels, VoD content, unicast streaming content, and others. It should be understood that the CPE/client device may retrieve multimedia content from one or more servers internal or external to the CPE/client device (e.g., DVR content). Multimedia content may be processed by a media processing module 210 and output to a subscriber through a display interface 215.

In embodiments, a CPE device or client device may be configured to provide a user interface with video frame tiles. The user interface may include one or more video frame tiles, wherein each video frame tile is associated with a video source (e.g., channel) or a piece of video content (e.g., VoD content, DVR content, etc.). For example, the video frame tile may include a display of video and, in some instances, audio associated with a specific piece of content or a piece of content associated with a specific video source. It will be appreciated by those skilled in the relevant art that the tile field user interface including each of one or more video frame tiles may be generated using various graphics libraries and/or various scripting languages.

In embodiments, a tile field module 220 may identify one or more content sources and/or pieces of content. The content sources (e.g., broadcast channels, unicast channels, streaming applications such as YouTube or Netflix, etc.) and/or pieces of content (e.g., VoD content, DVR content, etc.) may be identified based upon content that is available to the CPE/client device or subscriber associated with the CPE/client device. The content sources and/or pieces of content that are identified may be based upon various other factors such as a subscriber or device-specific history of accessed content, a content source category (e.g., live television or content, recorded content, VoD content, content available online or through an application such as YouTube or Netflix, etc.), a filter category (e.g., all content, favorites, trending, movies, sports, music, family, news, grid, etc.), or other selected parameters.

The tile field module 220 may retrieve a media rendering associated with each of the identified content sources and/or pieces of content. In embodiments, media renderings may be retrieved from an upstream network (e.g., provider network 120 of FIG. 1) through the network interface 205 or storage that is internal or external to the CPE/client device. In embodiments, the tile field module 220 may generate the media renderings by processing associated content that is received at the CPE/client device. It should be understood that images for reproduction into a video frame tile as a media rendering may be extracted from a source (e.g., single or multiple images, image tiles, audio/video (A/V) streams, etc.) at a constant frame rate or variable frame rate, and that the extracted images may have common or different quality, bit rate, resolution, and other characteristics.

In embodiments, a media rendering may be captured and decoded by a tuner associated with a CPE or client device. The CPE or client device may have only a single tuner, and the single tuner may be used to capture and decode content for use as media renderings associated with multiple video frame tiles. For example, a single tuner may capture and decode a single video stream including a mosaic of different pieces of content (e.g., lower resolution content), and each piece of content within the mosaic may be used to feed a different video frame tile within a video tile user interface.

In embodiments, a media rendering may be captured and decoded by an application (e.g., web browser, streaming video application, etc.) running on the CPE or client device. For example, content for use in a media rendering may be received as one or more still images or image sequences (e.g., compressed images transmitted using Hypertext Transfer Protocol (HTTP)). An application running on the CPE or client device may decode the received images or image sequences and display images or image sequences as a media rendering within a video frame tile. The media rendering may be a static image or an animated image and may be updated at a constant or variable frame rate depending on network conditions and the resolution and/or performance of a target device.

It will be appreciated by those skilled in the relevant art that media renderings may be retrieved or content for media rendering generation may be retrieved over a variety of interface and/or network types. For example, content and/or renderings may be received within broadcast, multicast, or unicast downstream channels, and from a variety of wired and/or wireless networks. The renderings and/or content may be received at the CPE or client device as a video stream or a data stream.

In embodiments, the tile field module 220 may process media renderings such that the renderings are suitable for display within a video frame tile. It will be appreciated by those skilled in the relevant art that various processing and coding techniques may be used to generate or transform a media rendering for display in a video frame tile within a tile field user interface. For example, media renderings may be reformatted, rescaled, cropped, or otherwise processed to be displayed in a video frame tile. It should be understood that other image processing algorithms (e.g., sharpening, color/contrast correction, etc.) may be applied when the media renderings are generated and/or when the media renderings are being displayed on a target or display device.

In embodiments, the media rendering of the content may be a live stream of the content currently being received from the associated content source, a sampling of the content being received from the associated content source, or a preview or summary of the content being received from the associated content source. The tile field module 220 may update the media content, for example, at a constant or variable frame per second rate. In embodiments, a media rendering may be a certain portion of an associated piece of content, or a preview or summary of the associated piece of content, the preview or summary including one or more segments of the associated content.

In embodiments, a media rendering may be generated as one or more still frames or images, a sequence of still video frames (e.g., images encoded using Joint Photographic Experts Group (JPEG), motion JPEG (MJPEG), or any other image compression method), or a constant or variable bit rate video stream (e.g., stream encoded using Moving Picture Experts Group (MPEG) or MPEG-2, H.264, high efficiency video coding (HEVC), or any other A/V compression method).

In embodiments, a media rendering may be generated at a constant or a variable frame rate, and may be generated at a single or multiple quality levels, bit rates, resolution levels, and other characteristics. The A/V characteristics of a generated media rendering may be based upon various factors, including but not limited to, the condition of an associated network, display resolution requirements, performance of targeted devices, and others.

A media rendering may be used to feed a single video frame tile within a tile field user interface, or may be used to feed multiple video frame tiles within a tile field user interface. For example, a single media rendering may be a single image or video sequence that includes a mosaic of content that may be displayed in the tile field user interface.

In embodiments, media renderings and/or content used by the tile field module 220 to generate a media rendering may be delivered using various techniques or protocols. For example, media renderings and/or content may be delivered using user datagram protocol (UDP), transmission control protocol (TCP) or TCP/IP, unicast protocols, multicast protocols, MPEG-2 transport stream, adaptive bitrate streaming protocols (e.g., HTTP streaming, etc.), and others.

In embodiments, the tile field module 220 may layout one or more video frame tiles within a field of video frame tiles, and may associate each of the one or more video frame tiles with a content source or piece of content. The retrieved media rendering for each content source or piece of content may be displayed within the video frame tile associated with the corresponding content source or piece of content. In embodiments, media renderings may be organized as video frame tiles within a tile field according to various factors or parameters (e.g., relevance to a user or device, user or device-specific history, etc.). In embodiments, the media renderings that are displayed in video frame tiles within the tile field may be associated with the most recently viewed video source(s) or piece(s) of content. For example, the media rendering associated with the most-recently viewed video source or piece of content may be positioned in the top-left location of the field of video frame tiles, and the media renderings associated with the earlier viewed video sources or pieces of content may be positioned to the right of the most-recently viewed video source of piece of content. The media rendering associated with the video source or piece of content viewed immediately earlier than the source or content associated with the rightmost tile in any row may be positioned in the leftmost location in the next lowest row.

In embodiments, the tile field user interface may be output to a subscriber through the display interface 215. The tile field user interface may be output at a display associated with a CPE device or client device, or may be output to a separate display device connected to a CPE device or client device. In embodiments, the tile field user interface may be output to a subscriber as a linear streaming channel or as a subscriber guide.

In embodiments, a subscriber may interact with the tile field user interface through the subscriber interface 225. For example, a subscriber can update the content sources and/or pieces of content shown in the tile field user interface by selecting a different content category (e.g., live television or content, recorded content, VoD content, content available online or through an application such as YouTube or Netflix, etc.), a different viewer, or by applying one or more content category filters (e.g., all content, favorites, trending, movies, sports, music, family, news, grid, etc.) to the tile field user interface.

In embodiments, a subscriber may select an individual video frame tile for closer examination by enabling and moving a highlight feature (e.g., a cursor) inside the field of tiles. The display of the selected or highlighted video frame tile may be distinguished from the other video frame tiles within the field. For example, a selected or highlighted video frame tile may be brighter or otherwise distinguished from the remaining video frame tiles, and/or the content displayed within the selected video frame tile may be updated at a faster rate than the other tiles.

Additional information such as a content summary, poster art, channel logo, and/or other information identifying or describing the content associated with a selected video frame tile may be displayed in the user interface. In embodiments, when a video frame tile associated with a video source is selected, information associated with programming in a next timeslot for the video source can be displayed in the user interface.

Figure 3:
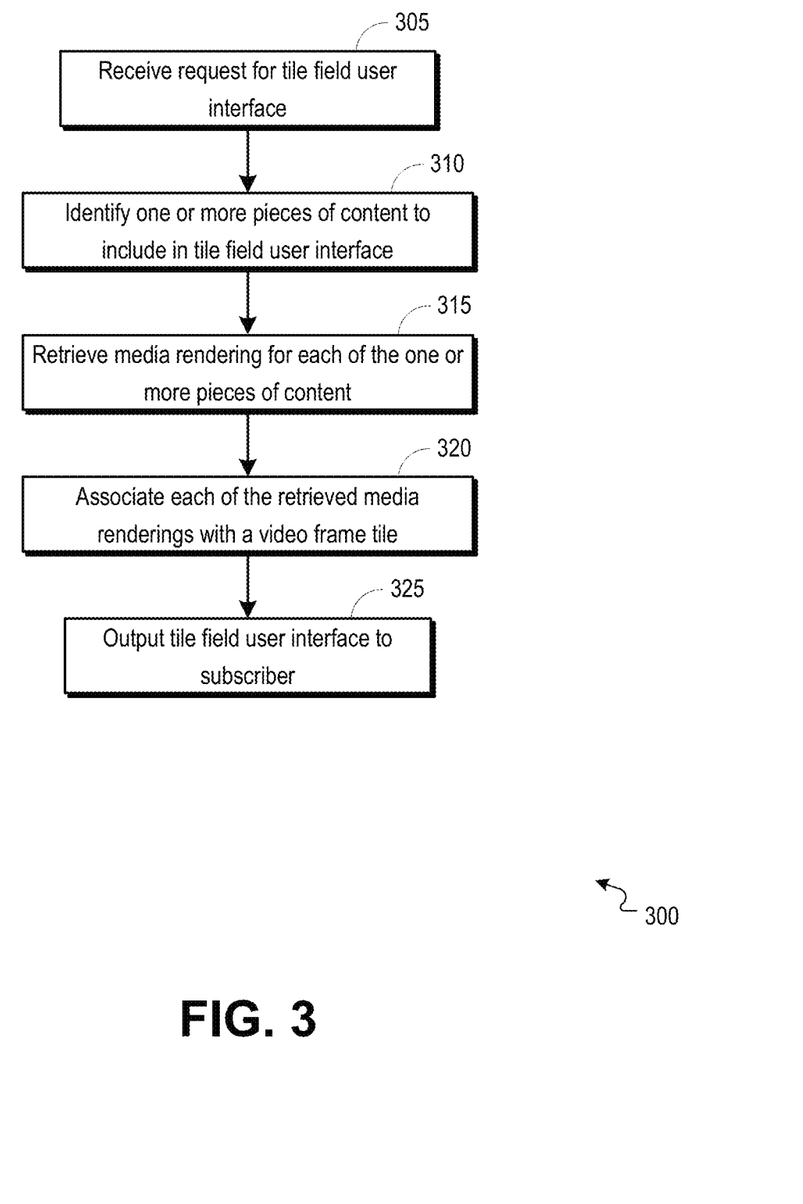
FIG. 3 is a flowchart illustrating an example process operable to facilitate the provisioning of a user interface with video frame tiles.

FIG. 3 is a flowchart illustrating an example process 300 operable to facilitate the provisioning of a user interface with video frame tiles. The process 300 can begin at 305, when a request for a tile field user interface is received. A request for a tile field user interface may be received at a CPE device (e.g., STB 105*a* of FIG. 1, gateway device 105*b* of FIG. 1, etc.) or a client device (e.g., client device 110*a-c* of FIG. 1). The request for the tile field user interface may be a request for an update to the media renderings displayed in the tile field user interface. For example, the media renderings displayed in the tile field user interface may be updated when a user applies a new user or content category filter to the tile field user interface. The request for the tile field user interface may result from a user tuning to a predetermined channel (e.g., guide channel) or may be received at a device when a user requests a guide using an input technique (e.g., remote control, touchscreen press, etc.).

At 310, one or more pieces of content to include in a tile field user interface may be identified. One or more pieces of content may include a specific content source and the content currently available from the content source. The one or more content sources and/or pieces of content may be identified, for example, by a tile field module 220 of FIG. 2. The content sources (e.g., broadcast channels, unicast channels, streaming applications such as YouTube or Netflix, etc.) and/or pieces of content (e.g., VoD content, DVR content, etc.) may be identified based upon content that is available to a specific device or subscriber. The content sources and/or pieces of content that are identified may be based upon various other factors such as a subscriber or device-specific history of accessed content, a content source category (e.g., live television or content, recorded content, VoD content, content available online or through an application such as YouTube or Netflix, etc.), a filter category (e.g., all content, favorites, trending, movies, sports, music, family, news, grid, etc.), or other selected parameters.

At 315, a media rendering for each of the one or more identified content sources and/or pieces of content may be retrieved. The media rendering(s) may be retrieved, for example, by the tile field module 220 of FIG. 2. Media renderings may be retrieved from an upstream network (e.g., provider network 120 of FIG. 1) or storage that is internal or external to a CPE device or client device. The media renderings may be generated at a CPE device or client device by processing associated content that is received at the CPE device or client device. It will be appreciated by those skilled in the relevant art that various processing and coding techniques may be used to generate or transform a media rendering for display in a video frame tile within a tile field user interface.

In embodiments, a media rendering associated with a content source may include a rendering of the media content currently available for viewing from the content source (e.g., live broadcast channel, streaming channel, storage internal or external to a CPE device, streaming application, etc.). The media rendering of the content may be a live stream of the content currently being received from the associated content source, a sampling of the content being received from the associated content source, or a preview or summary of the content being received from the associated content source. The media content may be updated, for example, at a constant or variable frame per second rate.

In embodiments, a media rendering associated with a piece of content may include a rendering of the media content associated with the specific piece of content (e.g., VoD content, DVR content, content available for streaming to a device, etc.). The rendering of the media content may be a certain portion of the associated piece of content, or a preview or summary of the associated piece of content, the preview or summary including one or more segments of the associated content.

In embodiments, a retrieved/generated media rendering may be processed (e.g., reformatted, scaled, etc.) for display within a video frame tile. For example, the size, ratio, resolution and/or other characteristics associated with a media rendering may be adjusted to support display of the media rendering within a video frame tile. Compression of the media rendering or content used to generate the media rendering may permit the media rendering to be displayed within a video frame tile at a variable frame rate. For example, the frame rate of the media rendering may be changed during playback of the media rendering within a video frame tile.

At 320, each of the retrieved media renderings may be associated with a video frame tile within the tile field user interface. The retrieved media renderings may be associated with a video frame tile, for example, by the tile field module 220 of FIG. 2. In embodiments, media renderings may be organized as video frame tiles within a tile field user interface according to various factors or parameters (e.g., relevance to a user or device, user or device-specific history, etc.). In embodiments, the media renderings that are displayed in video frame tiles within the tile field user interface may be associated with the most recently viewed video source(s) or piece(s) of content. For example, the media rendering associated with the most-recently viewed video source or piece of content may be positioned in the top-left location of the field of video frame tiles, and the media renderings associated with the earlier viewed video sources or pieces of content may be positioned to the right of the most-recently viewed video source of piece of content. The media rendering associated with the video source or piece of content viewed immediately earlier than the source or content associated with the rightmost tile in any row may be positioned in the leftmost location in the next lowest row.

At 325, the tile field user interface may be output to a subscriber. The tile field user interface may be output at a display associated with a CPE device or client device, or may be output to a separate display device connected to a CPE device or client device. In embodiments, the tile field user interface may be output to a subscriber as a linear streaming channel or as a subscriber guide.

Figure 4:
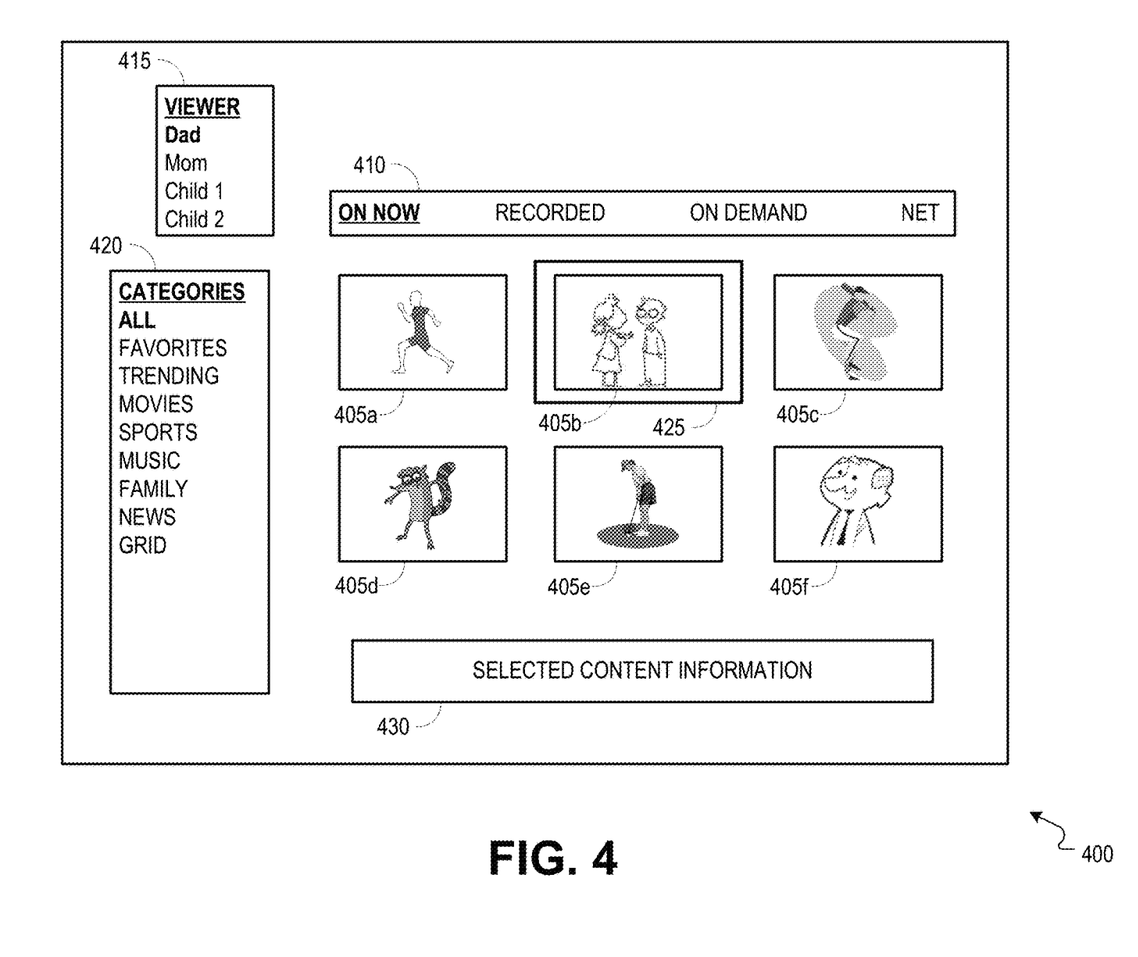
FIG. 4 is an illustration of an example tile field user interface displaying media renderings associated with selected content sources and/or pieces of content.

FIG. 4 is an illustration of an example tile field user interface 400 displaying media renderings associated with selected content sources and/or pieces of content. The tile field user interface 400 may be generated at a CPE device (e.g., STB 105*a* of FIG. 1, gateway device 105*b* of FIG. 1, etc.) or client device (e.g., client device 110*a-c* of FIG. 1, etc.), and may be displayed at the CPE device, client device, or other display device. It should be understood that the tile field user interface 400 may be generated at an upstream network component and streamed to a CPE device or client device.

In embodiments, the tile field user interface 400 may include one or more video frame tiles 405*a-f,* wherein each video frame tile 405 is associated with a video source (e.g., channel) or a piece of video content (e.g., VoD content, DVR content, content available for streaming to a device, etc.). For example, each video frame tile 405 may include a media rendering associated with a specific piece of content or a piece of content associated with a specific video source. The rendering of the media content may be a live stream of the content currently being received from an associated video source, a sampling of the content being received from an associated video source, or a preview or summary of the content being received from an associated video source. The media rendering of the content may be a certain portion of an associated piece of content, or a preview or summary of an associated piece of content, the preview or summary including one or more segments of the associated content. The media renderings displayed in the video frame tiles 405 may be updated, for example, at a constant or variable frame per second rate.

In embodiments, the video frame tiles 405 that are displayed in the tile field user interface 400 may be associated with the most recently viewed video source(s) or piece(s) of content. For example, a video frame tile associated with the most-recently viewed video source or piece of content (e.g., video frame tile 405a) may be positioned in the top-left location of the field of video frame tiles, and the video frame tiles associated with the earlier viewed video sources or pieces of content (e.g., video frame tiles 405b-f) may be positioned to the right of the most-recently viewed video source of piece of content. The video frame tile (e.g., video frame tile 405d) associated with the video source or piece of content viewed immediately earlier than the source or content associated with the rightmost tile in any row (e.g., video frame tile 405c) may be positioned in the leftmost location in the next lowest row of the tile field.

In embodiments, the one or more video frame tiles 405 displayed in the tile field user interface 400 may include media renderings of content associated with a specific category. For example, a subscriber may select a category from one or more available categories 410 (e.g., "On Now," "Recorded," "On Demand," "Net," etc.) to view video frame tiles 405 including media renderings associated with content that is available within the selected category.

In embodiments, displayed media renderings within the video frame tiles 405 may be associated with content that is related to a specific viewer. For example, a subscriber can select a viewer 415 from one or more viewers (e.g., Dad, Mom, Child 1, Child 2, etc.), and displayed video frame tiles 405 may include media renderings associated with content that is or is likely to be preferred by the selected viewer. The viewers may be displayed in the tile field user interface 400 using a picture or icon associated with each viewer, or may be identified by a unique name associated with each viewer. When a viewer is selected, the media renderings within the displayed video frame tiles 405 may be updated to show media renderings associated with the video source(s) and/or pieces of content most recently viewed by the selected viewer.

In embodiments, displayed media renderings within the video frame tiles 405 may be filtered according to a selected filter category 420 (e.g., all content, favorites, trending, movies, sports, music, family, news, grid, etc.). When a new filter category is selected, the media renderings displayed within each of the displayed video frame tiles 405 may be updated. For example, displayed media renderings within the video frame tiles 405 may be updated to show media content associated with a filter category when a subscriber selects the filter category.

In embodiments, a video frame tile 405 (e.g., 405b) may be selected for closer examination by enabling and moving a highlight feature (e.g., a cursor 425) inside the field of tiles. The display of the selected or highlighted video frame tile 405b may be distinguished from the other video frame tiles within the field of tiles. For example, a selected or highlighted video frame tile 405b may be brighter or otherwise distinguished from the remaining video frame tiles, and/or the media rendering displayed within the selected video frame tile 405b may be updated at a faster rate than the other video frame tiles within the field of tiles.

Additional content information (e.g., selected content information 430) such as a content summary, poster art, channel logo, and/or other information identifying or describing the content associated with a selected video frame tile (e.g., video frame tile 405b) may be displayed in the tile field user interface 400. In embodiments, when a video frame tile 405b associated with a video source is selected, information associated with programming in a next timeslot for the video source can be displayed within the selected content information 430.

Figure 5:
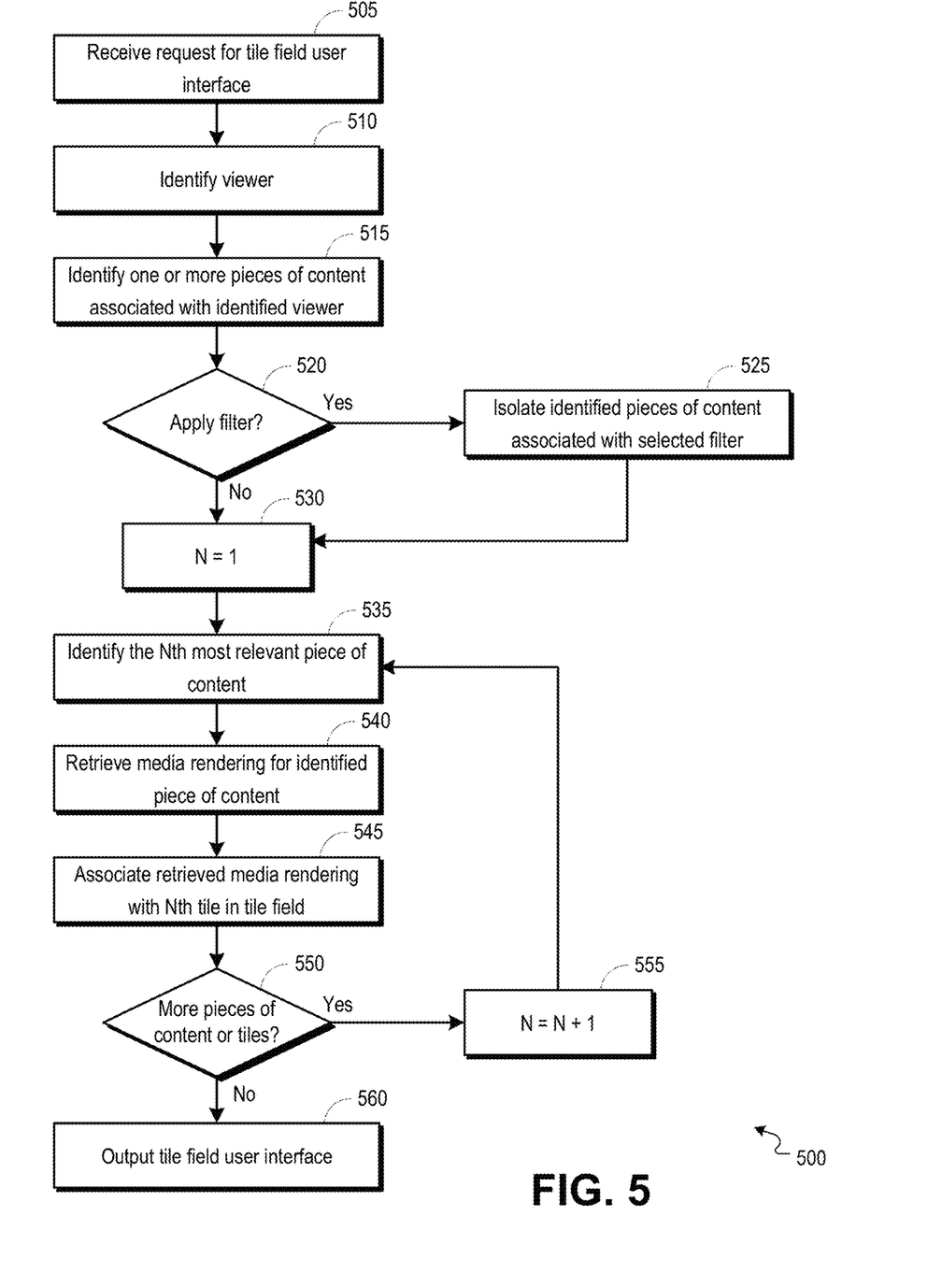
FIG. 5 is a flowchart illustrating an example process operable to facilitate the generation of a tile field user interface.

FIG. 5 is a flowchart illustrating an example process 500 operable to facilitate the generation of a tile field user interface. The process 500 can begin at 505, when a request for a tile field user interface is received. A request for a tile field user interface may be received at a CPE device (e.g., STB 105a of FIG. 1, gateway device 105b of FIG. 1, etc.) or a client device (e.g., client device 110a-c of FIG. 1). The request for the tile field user interface may be a request for an update to the media renderings displayed in the tile field user interface. For example, the media renderings displayed in the tile field user interface may be updated when a user applies a new viewer or content category filter to the tile field user interface. The request for the tile field user interface may result from a user tuning to a predetermined channel (e.g., guide channel) or may be received at a device when a user requests a guide using an input technique (e.g., remote control, touchscreen press, etc.).

At 510, a viewer may be identified. A certain viewer may be identified, for example, from within a displayed tile field user interface (e.g., the field user interface 400 of FIG. 4). The certain viewer (e.g., Dad, Mom, Child 1, Child 2, etc.) may be selected from a viewer window or tile 415 of FIG. 4 from within the tile field user interface 400. In embodiments, one or more viewers may be displayed within a user interface using a viewer image, icon, text, or other identifier uniquely identifying a viewer.

At 515, one or more pieces of content associated with the identified viewer may be identified. One or more pieces of content may include a specific content source and the content currently available from the content source. The one or more content sources and/or pieces of content may be identified, for example, by a tile field module 220 of FIG. 2. The content sources (e.g., broadcast channels, unicast channels, streaming applications such as YouTube or Netflix, etc.) and/or pieces of content (e.g., VoD content, DVR content, etc.) associated with the identified viewer may be identified based upon content that is available to a specific device or the viewer, content or content sources that have been previously viewed by the viewer or at a specific device, content or content sources that are similar to content or content sources previously viewed by the viewer or at a specific device, and other comparison factors. In embodiments, each of the identified pieces of content or sources may be associated with a relevance score based upon the strength of an association between the piece of content or source and the identified viewer. For example, the relevance score may be based upon the number of times the viewer has accessed a piece of content or source, the number of similarities between an identified piece of content or source and pieces of content preferred by the identified viewer (e.g., genre, cast, director, etc.), viewer preferences that are manually input (e.g., viewer likes), amount of time since last moment of viewing the content or content source, and other factors. It will be appreciated by those skilled in the relevant art that various techniques for ranking content based on viewer preference may be used.

At 520, a determination may be made whether to apply a filter to the identified content associated with the identified viewer. For example, the viewer may select one or more filter categories (e.g., live television or content, recorded content, VoD content, content available online or through an application such as YouTube or Netflix, all content, favorites, trending, movies, sports, music, family, news, grid, etc.) to be applied to the identified content. If the determination is made to apply a filter (i.e., one or more filters are selected by a viewer), the one or more identified pieces of content that are associated with the viewer and are further associated with the one or more selected filters may be isolated at 525. After isolating the identified pieces of content that are associated with the selected filter(s), the process 500 may proceed to 530.

If, at 520, the determination is made that no filters are to be applied, a process iteration value of N may be set to one (1) at 530, and the Nth most relevant piece of content within the identified pieces of content may be identified at 535. For example, all identified pieces of content associated with the selected viewer and/or any selected filters may be ranked according to relevance of the content to the viewer and/or any selected filters. It should be understood that various techniques or scoring systems may be used to rank the pieces of content. As one example, the content may be ranked in order of most recent access (e.g., playback) by the viewer.

At 540, a media rendering for the identified content sources and/or pieces of content (e.g., Nth most relevant piece of content) may be retrieved. The media rendering(s) may be retrieved, for example, by the tile field module 220 of FIG. 2. Media renderings may be retrieved from an upstream network (e.g., provider network 120 of FIG. 1) or storage that is internal or external to a CPE device or client device. The media renderings may be generated at a CPE device or client device by processing associated content that is received at the CPE device or client device. It will be appreciated by those skilled in the relevant art that various processing and coding techniques may be used to generate or transform a media rendering for display in a video frame tile within a tile field user interface.

In embodiments, a media rendering associated with a content source may include a rendering of the media content currently available for viewing from the content source (e.g., live broadcast channel, streaming channel, storage internal or external to a CPE device, streaming application, etc.). The media rendering of the content may be a live stream of the content currently being received from the associated content source, a sampling of the content being received from the associated content source, or a preview or summary of the content being received from the associated content source. The media content may be updated, for example, at a constant or variable frame per second rate.

In embodiments, a media rendering associated with a piece of content may include a rendering of the media content associated with the specific piece of content (e.g., VoD content, DVR content, content available for streaming to a device, etc.). The rendering of the media content may be a certain portion of the associated piece of content, or a preview or summary of the associated piece of content, the preview or summary including one or more segments of the associated content.

At 545, the retrieved media rendering may be associated with an Nth video frame tile within the tile field user interface. The retrieved media renderings may be associated with a video frame tile, for example, by the tile field module 220 of FIG. 2. In embodiments, media renderings may be organized as video frame tiles within a tile field user interface according to various factors or parameters (e.g., relevance to a user or device, user or device-specific history, etc.). In embodiments, the media renderings that are displayed in video frame tiles within the tile field user interface may be associated with the most recently viewed video source(s) or piece(s) of content. For example, the highest ranked piece of content may be the most-recently viewed video source or piece of content and may be associated with the first tile in the tile field (e.g., a tile positioned at the first slot in a top row of the interface), the first tile being positioned in the top-left location of the field of video frame tiles, and the lower-ranked pieces of content (e.g., the earlier viewed video sources or pieces of content) may be positioned to the right of the most-recently viewed video source of piece of content. The media rendering associated with the video source or piece of content viewed immediately earlier than the source or content associated with the rightmost tile in any row may be positioned in the leftmost location in the next lowest row.

As an example, the first tile position in a field of tiles may be the tile positioned in the upper-left of the tile field (e.g., the 405a of FIG. 4), and the media rendering associated with the most relevant (e.g., most preferred or most likely to be preferred per viewer, most recently viewed, etc.) of the identified pieces of content may be displayed at the first tile position. The second tile position in the field of tiles may be the tile positioned immediately adjacent to (e.g., to the immediate right of) the first tile position, and so on until the first row (e.g., tiles 405a-c of FIG. 4) is filled. After a row of tiles within the tile field is filled, the next tile position in the tile field may be the left-most position in the next row of tiles (e.g., the 405d of FIG. 4).

At 550, the determination may be made whether there are more pieces of content (following the Nth piece of content) within the identified pieces of content associated with the selected viewer and/or any filter category, or whether there are any other available tiles (following the Nth tile) within the tile field. If there is at least one more piece of content and at least one more available tile, the current process iteration value (i.e., N) may be incremented by one (1) at 555. After the process iteration value is incremented, the process 500 may return to 535.

If, at 550, the determination is made that there are no other pieces of content or that there are no more available tiles, the process 500 can proceed to 560. At 560, the tile field user interface may be output to a subscriber. The tile field user interface may be output at a display associated with a CPE device or client device, or may be output to a separate display device connected to a CPE device or client device. In embodiments, the tile field user interface may be output to a subscriber as a linear streaming channel or as a subscriber guide.

Figure 6:
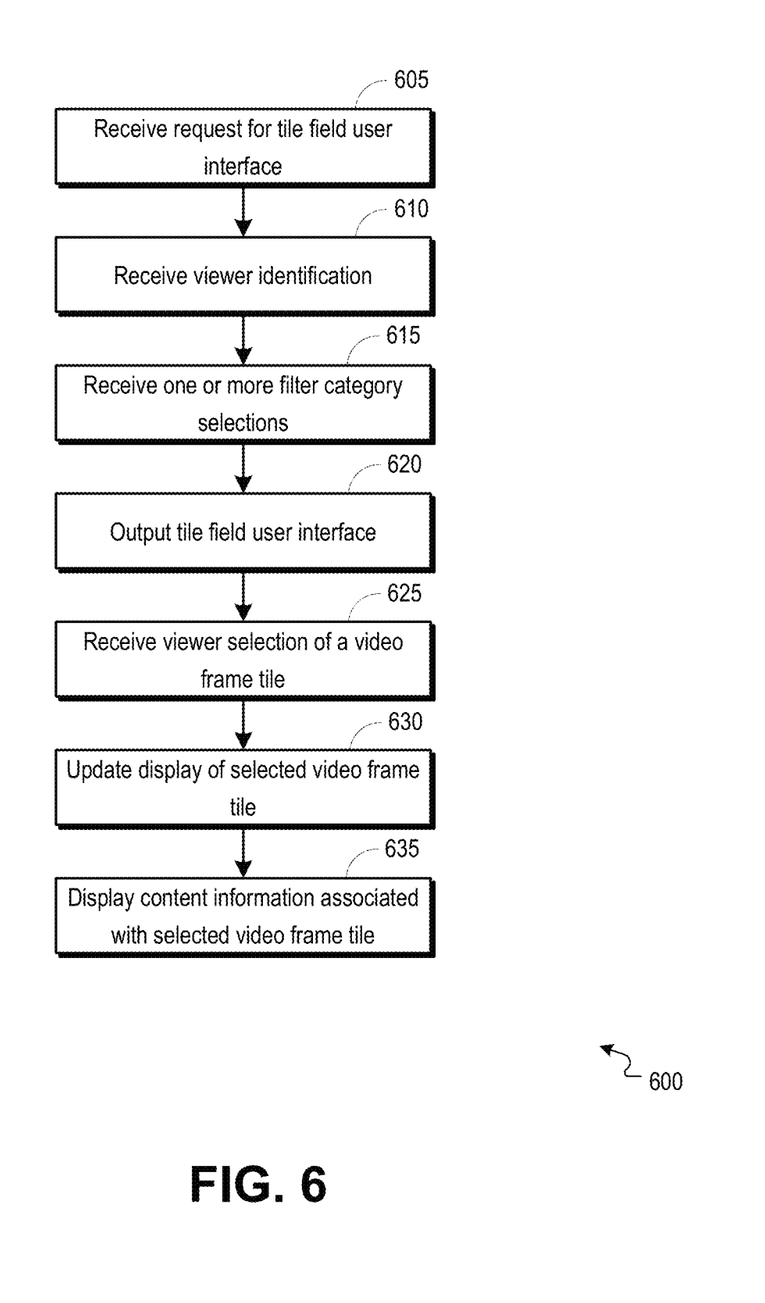
FIG. 6 is a flowchart illustrating an example process operable to facilitate the generation and navigation of a tile field user interface.

FIG. 6 is a flowchart illustrating an example process 600 operable to facilitate the generation and navigation of a tile field user interface. The process 600 can begin at 605, when a request for a tile field user interface is received. A request for a tile field user interface may be received at a CPE device (e.g., STB 105a of FIG. 1, gateway device 105b of FIG. 1, etc.) or a client device (e.g., client device 110a-c of FIG. 1). The request for the tile field user interface may result from a user tuning to a predetermined channel (e.g., guide channel) or may be received at a device when a user requests a guide using an input technique (e.g., button press at a remote control, touchscreen press, etc.).

At 610, a viewer identification may be received. A certain viewer may be identified, for example, from within a displayed tile field user interface (e.g., the field user interface 400 of FIG. 4). The certain viewer (e.g., Dad, Mom, Child 1, Child 2, etc.) may be selected from a viewer window or tile 415 of FIG. 4 from within the tile field user interface 400. In embodiments, one or more viewers may be displayed within a user interface using a viewer image, icon, text, or other identifier uniquely identifying a viewer. One or more pieces of content for use in one or more video frame tiles may be identified, wherein the identified pieces of content are associated (e.g., recently viewed, preferred, likely to be preferred, or otherwise relevant) with the identified viewer.

At 615, one or more filter category selections may be received. For example, the viewer may select one or more filter categories (e.g., live television or content, recorded content, VoD content, content available online or through an application such as YouTube or Netflix, all content, favorites, trending, movies, sports, music, family, news, grid, etc.) to be applied to the identified content (e.g., content associated with the identified viewer). If the determination is made to apply a filter (i.e., one or more filters are selected by a viewer), the one or more identified pieces of content that are associated with the viewer and that are further associated with the one or more selected filters may be isolated.

At 620, a tile field user interface may be generated and output to the viewer. Media renderings associated with the identified pieces of content (e.g., content associated with the viewer and any selected filter categories) may be retrieved and associated with individual video frame tiles within a tile field. The video frame tiles and tile field may be displayed within the output tile field user interface. It should be understood that the tile field user interface may be output to a display associated with a CPE or client device, or may be output to one or more separate display devices. In embodiments, the tile field user interface may be output to a subscriber as a linear streaming channel or as a subscriber guide.

At 625, a viewer selection of an individual video frame tile may be received. For example, a cursor may be controlled by viewer input to scroll over or highlight an individual video frame tile within the tile field user interface. The viewer may further select an individual video frame tile, for example, by actively selecting the video frame tile that is highlighted by a cursor.

At 630, the tile field user interface may be updated to reflect the viewer selection of the individual video frame tile. In embodiments, the individual video frame tile that is selected may be distinguished from the other video frame tiles within the tile field user interface. For example, the media rendering associated with the selected video frame tile may be displayed in brighter color than the media renderings associated with the other video frame tiles. As another example, the media rendering associated with the selected video frame tile may be displayed at a higher resolution or may be updated at a faster rate than the media renderings associated with the other video frame tiles.

At 635, the tile field user interface may be updated to display content information associated with the selected video frame tile. For example, content information (e.g., selected content information 430 of FIG. 4) such as a content summary, poster art, channel logo, and/or other information identifying or describing the content associated with a selected video frame tile (e.g., video frame tile 405*b* of FIG. 4) may be displayed in the tile field user interface. In embodiments, when a video frame tile associated with a video source is selected, information associated with programming in a next timeslot for the video source can be displayed within the tile field user interface.

Figure 7:
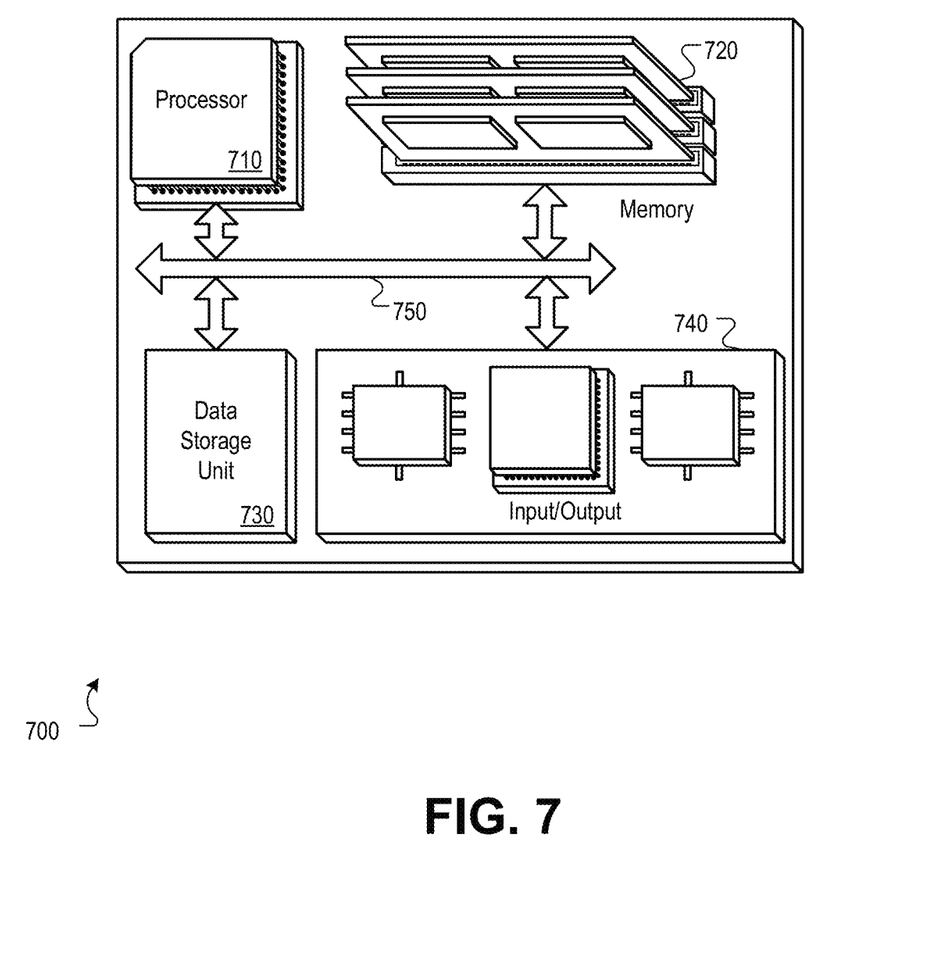
FIG. 7 is a block diagram of a hardware configuration operable to facilitate the provisioning of a user interface with video frame tiles.

FIG. 7 is a block diagram of a hardware configuration 700 operable to facilitate the provisioning of a user interface with video frame tiles. The hardware configuration 700 can include a processor 710, a memory 720, a storage device 730, and an input/output device 740. Each of the components 710, 720, 730, and 740 can, for example, be interconnected using a system bus 750. The processor 710 can be capable of processing instructions for execution within the hardware configuration 700. In one implementation, the processor 710 can be a single-threaded processor. In another implementation, the processor 710 can be a multi-threaded processor. The processor 710 can be capable of processing instructions stored in the memory 720 or on the storage device 730.

The memory 720 can store information within the hardware configuration 700. In one implementation, the memory 720 can be a computer-readable medium. In one implementation, the memory 720 can be a volatile memory unit. In another implementation, the memory 720 can be a non-volatile memory unit.

In some implementations, the storage device 730 can be capable of providing mass storage for the hardware configuration 700. In one implementation, the storage device 730 can be a computer-readable medium. In various different implementations, the storage device 730 can, for example, include a hard disk device, an optical disk device, flash memory or some other large capacity storage device. In other implementations, the storage device 730 can be a device external to the hardware configuration 700.

The input/output device 740 provides input/output operations for the hardware configuration 700. In one implementation, the input/output device 740 can include one or more of a network interface device (e.g., an Ethernet card), a serial communication device (e.g., an RS-232 port), one or more universal serial bus (USB) interfaces (e.g., a USB 2.0 port), one or more wireless interface devices (e.g., an 802.11 card), and/or one or more interfaces for outputting video and/or data services to a CPE device 105*a-b* of FIG. 1 (e.g., STB, gateway device, etc.) or client device 110*a-c* of FIG. 1 (e.g., television, computer, mobile device, tablet, etc.). In another implementation, the input/output device can include driver devices configured to send communications to, and receive communications from one or more networks (e.g., provider network 120 of FIG. 1, WAN 115 of FIG. 1, etc.).

Those skilled in the art will appreciate that the invention improves upon methods and systems for organizing and displaying available content to a subscriber. Methods, systems, and computer readable media can be operable to facilitate the provisioning of a user interface with video frame tiles. Specific content sources or pieces of content may be identified according to various parameters, and media renderings of the associated content may be generated. The media renderings may be processed at a device receiving the content, and a user interface including one or more of the media renderings may be generated. The media renderings may be organized within the user interface as individual video frame tiles.

The subject matter of this disclosure, and components thereof, can be realized by instructions that upon execution cause one or more processing devices to carry out the processes and functions described above. Such instructions can, for example, comprise interpreted instructions, such as script instructions, e.g., JavaScript or ECMAScript instructions, or executable code, or other instructions stored in a computer readable medium.

Implementations of the subject matter and the functional operations described in this specification can be provided in digital electronic circuitry, or in computer software, firmware, or hardware, including the structures disclosed in this specification and their structural equivalents, or in combinations of one or more of them. Embodiments of the subject matter described in this specification can be implemented as one or more computer program products, i.e., one or more modules of computer program instructions encoded on a tangible program carrier for execution by, or to control the operation of, data processing apparatus.

A computer program (also known as a program, software, software application, script, or code) can be written in any form of programming language, including compiled or interpreted languages, or declarative or procedural languages, and it can be deployed in any form, including as a stand-alone program or as a module, component, subroutine, or other unit suitable for use in a computing environment. A computer program does not necessarily correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub programs, or portions of code). A computer program can be deployed to be executed on one computer or on multiple computers that are located at one site or distributed across multiple sites and interconnected by a communication network.

The processes and logic flows described in this specification are performed by one or more programmable processors executing one or more computer programs to perform functions by operating on input data and generating output thereby tying the process to a particular machine (e.g., a machine programmed to perform the processes described herein). The processes and logic flows can also be performed by, and apparatus can also be implemented as, special purpose logic circuitry, e.g., an FPGA (field programmable gate array) or an ASIC (application specific integrated circuit).

Computer readable media suitable for storing computer program instructions and data include all forms of non-volatile memory, media and memory devices, including by way of example semiconductor memory devices (e.g., EPROM, EEPROM, and flash memory devices); magnetic disks (e.g., internal hard disks or removable disks); magneto optical disks; and CD ROM and DVD ROM disks. The processor and the memory can be supplemented by, or incorporated in, special purpose logic circuitry.

While this specification contains many specific implementation details, these should not be construed as limitations on the scope of any invention or of what may be claimed, but rather as descriptions of features that may be specific to particular embodiments of particular inventions. Certain features that are described in this specification in the context of separate embodiments can also be implemented in combination in a single embodiment. Conversely, various features that are described in the context of a single embodiment can also be implemented in multiple embodiments separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination.

Similarly, while operations are depicted in the drawings in a particular order, this should not be understood as requiring that such operations be performed in the particular order shown or in sequential order, or that all illustrated operations be performed, to achieve desirable results. In certain circumstances, multitasking and parallel processing may be advantageous. Moreover, the separation of various system components in the embodiments described above should not be understood as requiring such separation in all embodiments, and it should be understood that the described program components and systems can generally be integrated together in a single software product or packaged into multiple software products.

Particular embodiments of the subject matter described in this specification have been described. Other embodiments are within the scope of the following claims. For example, the actions recited in the claims can be performed in a different order and still achieve desirable results, unless expressly noted otherwise. As one example, the processes depicted in the accompanying figures do not necessarily require the particular order shown, or sequential order, to achieve desirable results. In some implementations, multitasking and parallel processing may be advantageous.

We claim:

1. A method comprising:
    receiving a request for a tile field user interface, wherein the request is received at a multimedia device from a user;
    identifying the user from which the request is received;
    identifying one or more pieces of content that are associated with the identified user;
    for each respective one piece of content of the one or more pieces of content, identifying a content source associated with the respective one piece of content;
    receiving a user selection of a filter category, wherein the filter category comprises an identification of a specific content source;
    identifying, from the one or more pieces of content that are associated with the identified user, one or more pieces of content that are associated with the specific content source;
    retrieving a media rendering for each respective one piece of content of the one or more pieces of content that are associated with the specific content source, wherein the media rendering for the respective one piece of content is generated from video retrieved from the content source associated with the respective one piece of content, and wherein one or more of the media renderings are generated from a live stream of content currently being received by the multimedia device from the content source associated with the one or more media renderings;
    generating the tile field user interface, wherein the tile field user interface comprises one or more tiles, and wherein generating the tile field user interface comprises:
    identifying a first piece of content from the one or more identified pieces of content, wherein the first piece of content comprises the piece of content most recently accessed by the identified user relative to the other one or more identified pieces of content;
    associating the media rendering for the first piece of content with a tile positioned at the first slot in a top row of the interface;
    identifying a second piece of content from the one or more identified pieces of content, wherein the second piece of content comprises the next most recently accessed piece of content, after the first piece of content, by the identified user; and associating the media rendering for the second piece of content with a tile positioned immediately adjacent to the tile associated with the first piece of content;

outputting the tile field user interface to a display, wherein outputting the tile field user interface comprises:

for each respective one piece of content of the one or more pieces of content that are associated with the specific content source, displaying the media rendering associated with the respective one piece of content within the tile selected for the respective one piece of content, wherein the media rendering comprises video associated with the respective one piece of content, and wherein the video associated with the respective one piece of content is displayed at a first frame rate; and in response to receiving user input, wherein the user input comprises a user selection of a tile within the interface, displaying the media rendering associated with the selected tile at a second frame rate, wherein the second frame rate is faster than the first frame rate.

2. The method of claim 1, wherein the media rendering for each of the one or more pieces of content is displayed within an associated tile at a variable frame per second rate.

3. The method of claim 1, further comprising:
receiving user input, wherein a tile within the interface is selected; and
increasing a rate at which the media rendering associated with the selected tile is updated.

4. The method of claim 1, wherein one or more of the identified pieces of content are identified based on a content source associated with each of the pieces of content.

5. The method of claim 1, further comprising:
receiving user input, wherein the user input comprises a selection of one or more filter categories; and
wherein the identified one or more pieces of content comprise pieces of content associated with the one or more filter categories.

6. The method of claim 1, wherein associating each of the retrieved media renderings with a tile within an interface comprising one or more tiles comprises:
organizing the layout of tiles within the interface based on relevance of the associated pieces of content to a user.

7. The method of claim 1, further comprising:
receiving user input, wherein the user input comprises an identification of a viewer; and
wherein the identified one or more pieces of content comprise pieces of content associated with the viewer.

8. The method of claim 1, wherein the retrieved media rendering associated with a respective piece of content of the one or more identified pieces of content is generated from one or more still frame images associated with the respective piece of content.

9. The method of claim 1, wherein the retrieved media rendering associated with a respective piece of content of the one or more identified pieces of content is generated from one or more sequences of still video frames associated with the respective piece of content.

10. The method of claim 1, wherein the retrieved media rendering associated with a respective piece of content of the one or more identified pieces of content is generated from one or more video streams associated with the respective piece of content.

11. An apparatus comprising:
a module that:
identifies a user based upon a request for a tile field user interface received from the user;
identifies one or more pieces of content that are associated with the identified user;
identifies, for each respective one piece of content of the one or more pieces of content, a content source associated with the respective one piece of content;
receives a user selection of a filter category, wherein the filter category comprises an identification of a specific content source;
identifies, from the one or more pieces of content that are associated with the identified user, one or more pieces of content that are associated with the specific content source;
retrieves a media rendering for each respective one piece of content of the one or more pieces of content that are associated with the specific content source, wherein the media rendering for the respective one piece of content is generated from video retrieved from the content source associated with the respective one piece of content, and wherein the media rendering is generated from a live stream of content currently being received by the multimedia device from the content source associated with the media rendering; and
generates the tile field user interface, wherein the tile field user interface comprises one or more tiles, and wherein generating the tile field user interface comprises:
identifying a first piece of content from the one or more identified pieces of content, wherein the first piece of content comprises the piece of content most recently accessed by the identified user relative to the other one or more identified pieces of content;
associating the media rendering for the first piece of content with a tile positioned at the first slot in a top row of the interface;
identifying a second piece of content from the one or more identified pieces of content, wherein the second piece of content comprises the next most recently accessed piece of content, after the first piece of content, by the identified user; and
associating the media rendering for the second piece of content with a tile positioned immediately adjacent to the tile associated with the first piece of content;
an interface that outputs the tile field user interface to a display, wherein outputting the tile field user interface comprises:
for each respective one piece of content of the one or more pieces of content that are associated with the specific content source, displaying the media rendering associated with the respective one piece of content within the tile selected for the respective one piece of content, wherein the media rendering comprises video associated with the respective one piece of content, and wherein the video associated with the respective one piece of content is displayed at a first frame rate; and
in response to a received user input, wherein the user input comprises a user selection of a tile within the interface, displaying the media rendering associated with the selected tile at a second frame rate, wherein the second frame rate is faster than the first frame rate.

12. The apparatus of claim 11, wherein the retrieved media rendering associated with a respective piece of content of the one or more identified pieces of content is generated from one or more still frame images associated with the respective piece of content.

13. The apparatus of claim 11, wherein the retrieved media rendering associated with a respective piece of content of the one or more identified pieces of content is generated from one or more sequences of still video frames associated with the respective piece of content.

14. The apparatus of claim 11, wherein the retrieved media rendering associated with a respective piece of content of the one or more identified pieces of content is generated from one or more video streams associated with the respective piece of content.

15. One or more non-transitory computer readable media having instructions that cause one or more processors to perform the operations comprising:
receiving a request for a tile field user interface, wherein the request is received at a multimedia device from a user;
identifying the user from which the request is received;
identifying one or more pieces of content that are associated with the identified user;
for each respective one piece of content of the one or more pieces of content, identifying a content source associated with the respective one piece of content;
receiving a user selection of a filter category, wherein the filter category comprises an identification of a specific content source;
identifying, from the one or more pieces of content that are associated with the identified user, one or more pieces of content that are associated with the specific content source;
retrieving a media rendering for each respective one piece of content of the one or more pieces of content that are associated with the specific content source, wherein the media rendering for the respective one piece of content is generated from video retrieved from the content source associated with the respective one piece of content, and wherein one or more of the media renderings are generated from a live stream of content currently being received by the multimedia device from the content source associated with the one or more media renderings;
generating the tile field user interface, wherein the tile field user interface comprises one or more tiles, and wherein generating the tile field user interface comprises:
identifying a first piece of content from the one or more identified pieces of content, wherein the first piece of content comprises the piece of content most recently accessed by the identified user relative to the other one or more identified pieces of content;
associating the media rendering for the first piece of content with a tile positioned at the first slot in a top row of the interface;
identifying a second piece of content from the one or more identified pieces of content, wherein the second piece of content comprises the next most recently accessed piece of content, after the first piece of content, by the identified user; and
associating the media rendering for the second piece of content with a tile positioned immediately adjacent to the tile associated with the first piece of content;
outputting the tile field user interface to a display, wherein outputting the tile field user interface comprises:
for each respective one piece of content of the one or more pieces of content that are associated with the specific content source, displaying the media rendering associated with the respective one piece of content within the tile selected for the respective one piece of content, wherein the media rendering comprises video associated with the respective one piece of content, and wherein the video associated with the respective one piece of content is displayed at a first frame rate; and
in response to receiving user input, wherein the user input comprises a user selection of a tile within the interface, displaying the media rendering associated with the selected tile at a second frame rate, wherein the second frame rate is faster than the first frame rate.

16. The one or more non-transitory computer-readable media of claim 15, wherein the instructions are further operable to cause one or more processors to perform the operations comprising:
receiving user input, wherein a tile within the interface is selected; and
increasing a rate at which the media rendering associated with the selected tile is updated.

17. The one or more non-transitory computer-readable media of claim 15, wherein the retrieved media rendering associated with a respective piece of content of the one or more identified pieces of content is generated from one or more still frame images associated with the respective piece of content.

18. The one or more non-transitory computer-readable media of claim 15, wherein the retrieved media rendering associated with a respective piece of content of the one or more identified pieces of content is generated from one or more sequences of still video frames associated with the respective piece of content.

19. The one or more non-transitory computer-readable media of claim 15, wherein the retrieved media rendering associated with a respective piece of content of the one or more identified pieces of content is generated from one or more video streams associated with the respective piece of content.

* * * * *